May 30, 1961  G. J. HARMON  2,986,731
PULSE RADAR SYSTEM
Filed June 16, 1955

INVENTOR
Gregory J. Harmon
BY W. E. Thibodeau, A. W. Dew
and J. D. Edgerton
ATTORNEYS United States Patent Office 2,986,731
Patented May 30, 1961

2,986,731
PULSE RADAR SYSTEM
Gregory J. Harmon, Brooklyn, N.Y., assignor to the United States of America as represented by the Secretary of the Army
Filed June 16, 1955, Ser. No. 516,057
1 Claim. (Cl. 343—17.1)

This invention relates to radar and radio systems. More particularly, the invention provides radar and radio systems that automatically shift frequency whenever interference of predetermined minimum amplitude and duration is encountered, thus dodging the interference. The invention is especially applicable to pulsed radar systems.

A principal object of my invention is to provide an economical and effective receiver for pulsed radar that will automatically dodge interference or noise of predetermined minimum amplitude received for a predetermined time.

A further object of my invention is to provide a pulsed radar system in which both transmitter and receiver automatically shift frequency when interference is encountered.

Other objects, aspects, uses and advantages of my invention will become apparent from the accompanying drawing, in which—

Figure 2A:
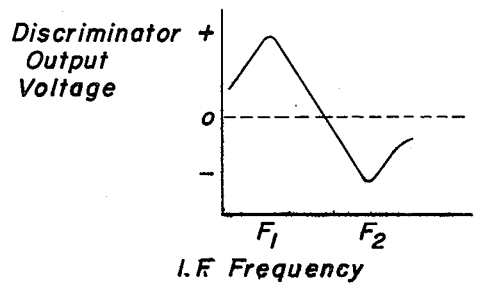
Figure 2B:
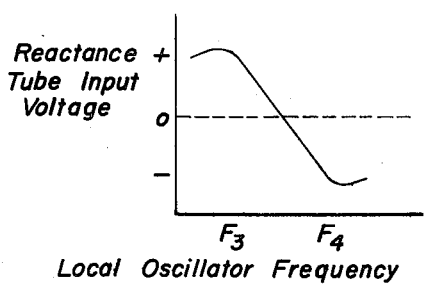
Figure 1:
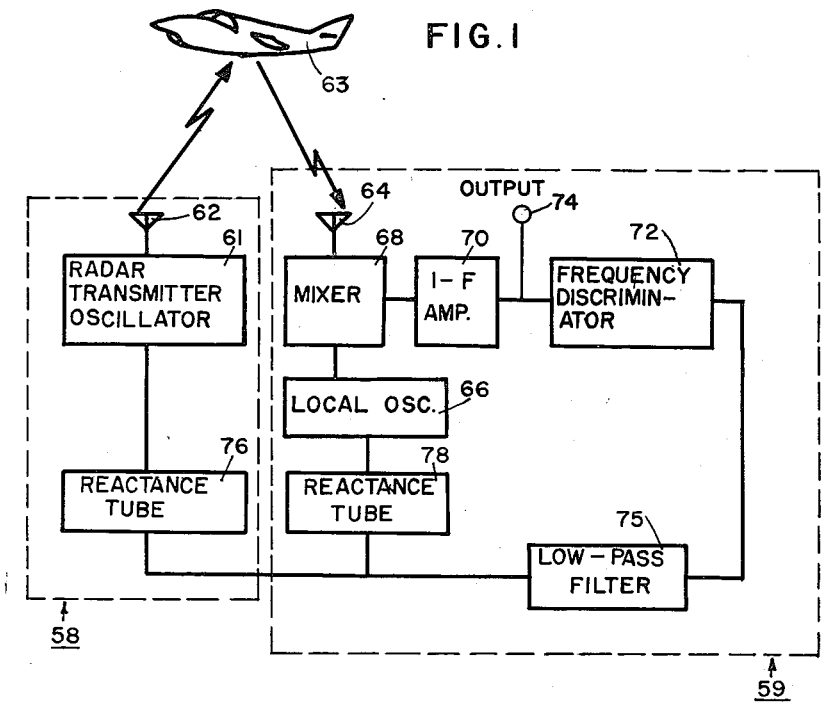

Figure 1 is a block diagram of a continuous interference-dodging radar system in accordance with my invention, Figure 2a represents the voltage-frequency characteristic of the discriminator of Figure 1, and, Figure 2b represents the voltage-frequency characteristic of the reactance tube of Figure 1.

In Fig. 1, radar transmitter 58 comprising oscillator 61, reactance tube 76, and antenna 62 radiates pulses of radiofrequency energy. Echo pulses are reflected from an object 63 and are picked up by receiving antenna 64 of radar receiver 59. The echo pulses from antenna 64 are heterodyned against local oscillator 66 in mixer 68 to produce intermediate-frequency pulses that are amplified by amplifier 70. The output of amplifier 70 is fed to output 74 and also to frequency discriminator 72. The output of discriminator 72 is fed to receiver output terminal 74 and also through low-pass filter 75 to reactance tubes 76 and 78. Reactance tube 76 is connected across the frequency-determining elements of transmitter oscillator 61, while reactance tube 78 is connected across the frequency-determining elements of local oscillator 66.

The polarity of the connection from discriminator 72 to tubes 76 and 78 is the opposite of that used in well known automatic-frequency-control circuits. That is, the slopes of the discriminator output voltage vs. I.F. frequency and reactance tube input voltage vs. local oscillator frequency characteristics have the same sense, whereas in the conventional A-F-C circuit the slopes are opposite in sense. This can be seen from an examination of Figs. 2a and 2b wherein these characteristics are shown. The range $F_1$ to $F_2$ is greater than the bandwidth of I.F. amplifier 70 at high attenuation. The frequency range $F_3$ to $F_4$ in Fig. 2b is the same as the range $F_1$ to $F_2$ in Fig. 2a, and consequently operation of the system is restricted to that frequency range. As a result, an interfering signal received by antenna 64 causes reactance tube 78 to detune receiver 59 away from the interfering signal. At the same time, however, reactance tube 76 shifts the frequency of transmitter 58, keeping transmitter 58 tuned at all times to the same frequency as receiver 59. A stable or limiting condition eventually occurs when the incoming interference has been moved to a point on the side of the pass band where I.F. attenuation is sufficient to reduce discriminator output at a greater rate than shifting frequency increases the output. The system thus automatically dodges interference. The system is preferably designed to shift frequency only in response to interfering signals having a duration somewhat greater than the duration of the desired echo pulses. This result can be achieved by means of low-pass filter 75 or by other well known methods.

It will be understood that it will sometimes be satisfactory to cause the interfering signal to shift the frequency of the receiver only; the transmitter oscillator 61 can be frequency modulated, so that each transmitted pulse occupies a fairly broad band in the spectrum. Reactance tube 76 can then be omitted, and the receiver will dodge interference by shifting to various frequencies within the bandwidth of the transmitter.

It will be apparent that the embodiments shown are only exemplary and that various modifications can be made in construction and arrangement within the scope of the invention as defined in the appended claim.

I claim:

A radar system having means for dodging interference occurring at its operating frequency, said radar system comprising in combination: a radio-frequency pulse oscillator, a first reactance tube connected to said oscillator so as to vary the frequency thereof in response to signals applied to said first reactance tube, a transmitter antenna connected to said oscillator so as to radiate radio-frequency pulses towards an object, a receiver antenna adapted to receive the echo pulses reflected from said object, a mixer to which the received echo pulses are fed, a local oscillator also feeding a signal to said mixer, a second reactance tube connected to said local oscillator so as to vary the frequency thereof in response to signals applied to said second reactance tube, said echo pulses being heterodyned against the local oscillator signal in said mixer so as to produce intermediate-frequency pulses at the output thereof, an intermediate-frequency amplifier to which said intermediate-frequency pulses are fed for amplification, a frequency discriminator connected to the output of said intermediate-frequency amplifier, and a low pass filter connected to the output of said frequency discriminator, the output of said low pass filter being applied to said first and second reactance tubes, said frequency discriminator, said filter and said first and second reactance tubes being so constructed and arranged in cooperation with said pulse oscillator and said local oscillator that an interfering signal of the same frequency as the radio frequency of said pulse oscillator received by said receiver antenna and having a duration greater than the duration of one of said echo pulses causes said first and second reactance tubes to shift the frequencies of said pulse oscillator and said local oscillator by equal amounts, thereby effectively dodging said interfering signal.

References Cited in the file of this patent

UNITED STATES PATENTS

| | | |
|---|---|---|
| 2,603,744 | Larson | July 15, 1952 |

FOREIGN PATENTS

| | | |
|---|---|---|
| 536,041 | Great Britain | Apr. 30, 1941 |
| 946,250 | France | May 27, 1949 |